(12) United States Patent
Datta et al.

(10) Patent No.: US 11,714,868 B1
(45) Date of Patent: Aug. 1, 2023

(54) GENERATING A SUGGESTION INVENTORY

(71) Applicant: Snap Inc., Santa Monica, CA (US)

(72) Inventors: Amit Datta, Los Angeles, CA (US); Aleksandra Korolova, Santa Monica, CA (US); Vasyl Pihur, Santa Monica, CA (US); Subhash Sankuratripati, Playa Vista, CA (US); Balamurugan Anandan, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 535 days.

(21) Appl. No.: 16/505,344

(22) Filed: Jul. 8, 2019

Related U.S. Application Data

(60) Provisional application No. 62/695,597, filed on Jul. 9, 2018.

(51) Int. Cl.
  *G06F 16/9536* (2019.01)
  *G06F 16/901* (2019.01)
  *G06Q 50/00* (2012.01)
  *G06F 16/9535* (2019.01)

(52) U.S. Cl.
  CPC ........ *G06F 16/9536* (2019.01); *G06F 16/9024* (2019.01); *G06F 16/9535* (2019.01); *G06Q 50/01* (2013.01)

(58) Field of Classification Search
  CPC ............... G06F 16/2457; G06F 16/951; G06F 16/90335; G06F 16/24578; G06F 16/24534; G06F 16/9536; G06F 16/9024; G06Q 50/01; G06F 16/901; G06Q 50/00; G06F 16/9535
  See application file for complete search history.

(56) References Cited

U.S. PATENT DOCUMENTS

| | | | | |
|---|---|---|---|---|
| 2014/0214936 | A1* | 7/2014 | Abraham et al. | H04W 4/21 709/204 |
| 2015/0370798 | A1* | 12/2015 | Ju et al. | G06F 16/24578 707/748 |
| 2016/0057246 | A1* | 2/2016 | Krishnaiahsetty | G06Q 20/24 709/204 |
| 2016/0162586 | A1* | 6/2016 | Maxwell et al. | H04W 4/21 707/733 |
| 2017/0340963 | A1* | 11/2017 | Bucher et al. | A63F 13/40 |
| 2017/0344610 | A1* | 11/2017 | Evnine et al. | G06F 16/9535 |
| 2018/0121269 | A1* | 5/2018 | Grewal et al. | G06F 9/546 |
| 2018/0157668 | A1* | 6/2018 | Raichelgauz et al. | G06F 16/4393 |
| 2019/0034963 | A1* | 1/2019 | George et al. | G06N 5/04 |
| 2019/0391906 | A1* | 12/2019 | Paul | G06F 8/38 |

* cited by examiner

*Primary Examiner* — Kris E Mackes
*Assistant Examiner* — Soheila (Gina) Davanlou
(74) *Attorney, Agent, or Firm* — Schwegman Lundberg & Woessner, P.A.

(57) ABSTRACT

Disclosed are methods and systems for generating a suggestion inventory that provides improved user engagement while ensuring privacy of relationships on a social network. The methods and systems include accessing an entity graph that specifies connections between a plurality of users on the social network; identifying a first candidate user of the plurality of users that is indirectly connected to a given user of the plurality of users; computing a number of unique paths on the entity graph between the first candidate user and the given user; determining that the number of unique paths exceeds a first threshold and includes a minimum number of friends of the given user that are directly connected to the given user on the entity graph; and adding the first candidate friend to a friend suggestion inventory for the given user in response to the determination.

20 Claims, 10 Drawing Sheets

GENERATING A SUGGESTION INVENTORY

CROSS-REFERENCE TO RELATED APPLICATION

This application claims the benefit of priority of U.S. Provisional Pat. Application No. 62/695,597, entitled "GENERATING A SUGGESTION INVENTORY," filed on Jul. 9, 2018, the entirety of which is hereby incorporated by reference herein.

TECHNICAL FIELD

The present disclosure generally relates to the technical field of social networks.

BACKGROUND

Uses for social networks are expanding. Originally conceived as a method to make it easier to keep in touch with friends, social networks are now providing front end functionality for a variety of Internet capabilities, including news, ecommerce, messaging, classified advertisement, and other features. To that end, the easier it is for users to employ the features of social networks to solve problems specific to their needs, the more readily the users adopt these features.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
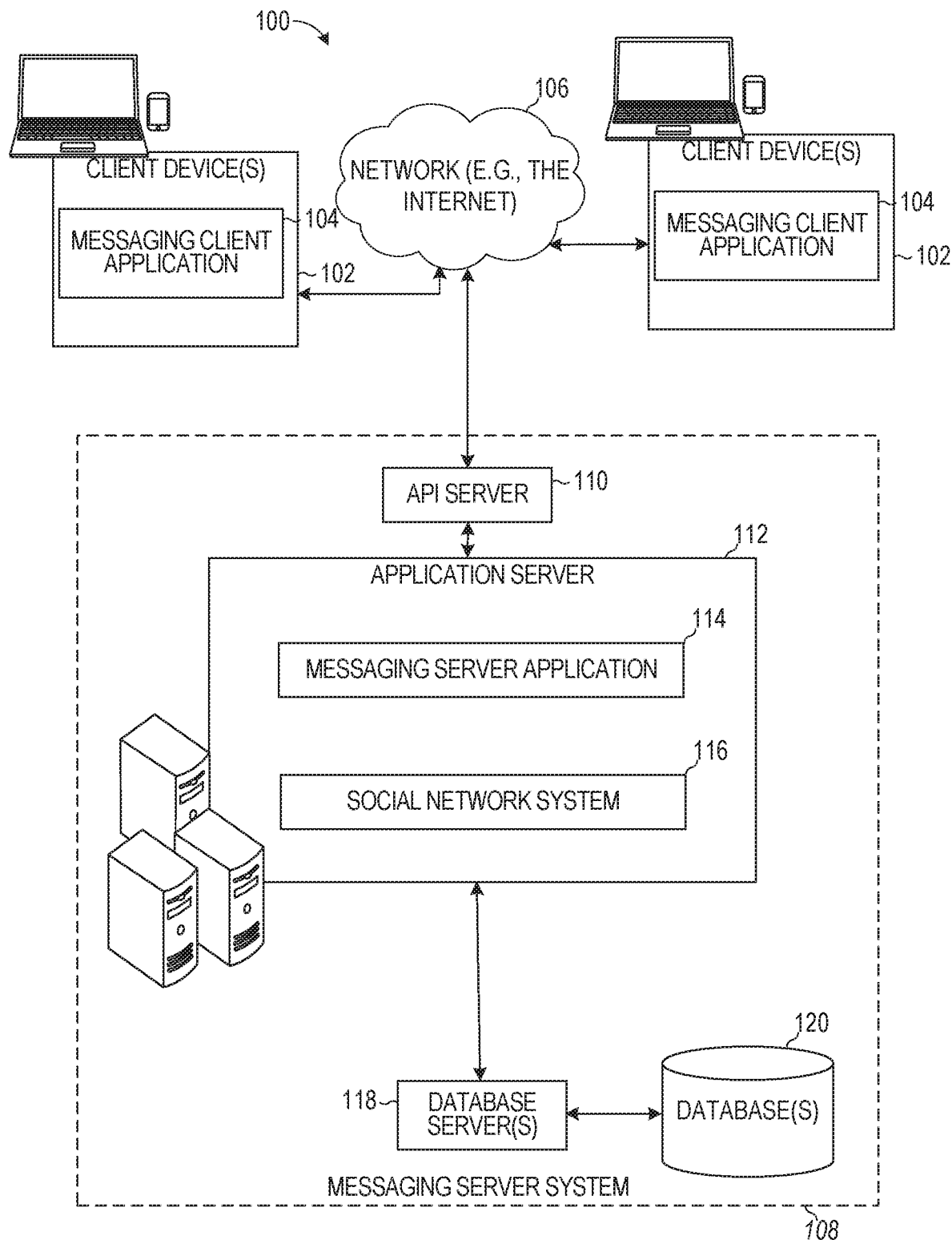
FIG. 1 is an exemplary block diagram of a messaging system for exchanging data (e.g., messages and associated content) over a network.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the disclosure. It will be evident, however, to those skilled in the art, that embodiments of the disclosure may be practiced without these specific details. In general, well-known instruction instances, protocols, structures, and techniques are not necessarily shown in detail.

Online social networks (OSNs) are a common platform for people to connect with each other. To help users find new friends and to connect with old friends, OSNs make friend suggestions based on the existing friend graph of the user. Often, a suggestion is an individual in the extended friend network (e.g., 2hop or 3hop friends) of the user. If not generated carefully, these suggestions can reveal friend relationships between other users to the recipient. Since a user's friend list may be private by default, it should be kept private while making friend suggestions.

A layman's privacy preserving solution is to not generate any friend suggestions. However, this prevents users from finding friends and reduces utility. Some prior approaches attempt to preserve privacy by allowing a user to make their friends-list private. Such approaches, specifically, provide settings to set the visibility of a user's friends to only friends of the user (e.g., other users who are directly connected to the user on the social network). However, in these approaches other users can still see mutual friends between the users which can compromise a user's privacy. For example, an attacker (or adverse party) who is interested in inferring whether an edge between two people, Alice and Bob, exists (e.g., whether Alice and Bob are indirectly connected via a common friend with whom Alice and Bob have a direct connection), can befriend either one of Alice or Bob and see whether the other will be displayed as the mutual friend in the profile.

To address this conflict between privacy and utility, the disclosed embodiments provide a privacy centric strategy for suggesting friends. Through several tunable parameters, this strategy enables trading off between privacy against adversaries and utility of recommendations of candidate friends to users and the platform. The disclosed approach identifies which users can be included as friend suggestions (candidate friend suggestions) for each individual user without placing restrictions on how they must be ranked or whether they should include a minimum percentage of noise. The disclosed embodiments rely on the inherent complexity of the graph connecting users on a social network to preserve privacy. In this way, the disclosed approach can suggest friends to a given user without compromising privacy of the given user, the given user's friends, or the candidates suggested as friends to the given user.

According to some embodiments, the candidate friends are identified on the basis of the length of a path from a given user to the candidate friend, the number of unique paths from the given user to the candidate friend and the number of friends of the given user that are on each of the unique paths. Particularly, according to some embodiments, an entity graph that specifies connections between a plurality of users on the social network is accessed and used to identify a first candidate user of the plurality of users on the social network that is indirectly connected to a given user of the plurality of users on the entity graph. The social network may include any number of different social network platforms and/or a given user's contact list. Particularly, the disclosed embodiments select candidate users to recommend to a given user across multiple social networks. For example, a given user on one social network (e.g., who has an account with one social network) may be provided with a candidate friend as a suggest who is on a different social network (e.g., has an account with the different social network). The candidate user, in some implementations, may be another user on the social network that is connected to the given user via a common friend. Specifically, the candidate user may not be directly connected to the given user but may be directly connected to a given friend of the given user with whom the given user also has a direct connection.

The disclosed embodiments compute a number of unique paths on the entity graph between the first candidate user and the given user and determine whether the number of unique paths exceeds a first threshold and whether the unique paths include a minimum number of friends of the given user that are directly connected to the given user on the entity graph. In such circumstances, the disclosed embodiments, add the first candidate friend to a friend suggestion inventory for the given user in response to determining that the number of unique paths exceeds a first threshold and that the unique paths include a minimum number of friends of the user that are directly connected to the given user on the entity graph.

In some embodiments, to further enhance and maintain privacy of the users, the disclosed embodiments compute, for each of the unique paths, a number of edges of each of the unique paths and exclude, from the number of unique paths, a given one of the unique paths for which the computed number of edges exceeds an edge threshold value. In this way, a restriction is placed to avoid choosing candidate friends to recommend to the given user who are more than a threshold distance away (e.g., are indirectly connected to the given user via more than a threshold number of other user or connections).

In some embodiments, to further enhance and maintain privacy of the users, the disclosed embodiments randomly or pseudo-randomly modify the parameters (e.g., the thresholds of the number of paths, number of common friends on the paths, and/or the lengths of the paths) used to add candidate friends to the friend suggestion inventory. In some instances, the parameters are modified periodically and/or whenever a new friend suggestion is performed. In some embodiments, after the friend suggestion inventory is created, the given user is presented with the inventory to allow the user to choose to form a direct connection (or befriend) with a particularly candidate user that is in the inventory.

In some aspects, users who are friends on a social network, such as users who have two way directed paths to each other on the social network, can view content associated with each other. Namely, content displayed to a particular user may be based on whether this relationship exists. For example, content provided by a first user may be displayed to a second user on condition of such a relationship existing between the two users. The content may be displayed proactively by the social network without an explicit request by the second user in some aspects. In some aspects, browsing of the first user's content may be allowed when the relationship exists with the second user. This may allow the second user to request display of particular content of the first user, which may then be permitted based on whether a relationship exists between the first user and second user.

Whether a particular type of relationship exists between a first user and a second user may be recorded in a database or entity graph that includes a directed graph with user to user connections. For example, a database table may include entries that identify relationships between users. If an entry in the table shows a relationship between the first and second user, then the relationship may be considered to exist within the environment of the social network. In some aspects, the relationship may be represented as "friends." However, in other aspects, the relationship may be presented as "relatives," "partners" or other human oriented relationships. However, technically, the relationship may be used to provide access to content by a first user in the relationship to a second user in the relationship.

In the disclosed embodiments, a suggestion for establishing of a relationship between two users may be displayed to a first of the users based on a candidate friend selection function that considers one or more parameters or criteria. For example, the function suggests a candidate user as a friend to a given user as long as a first parameter is satisfied, such as if the candidate user is connected to the first user by K paths, and/or as long as a second parameter is satisfied, such as if the K paths are at most of length L, and/or as long as a third parameter is satisfied, such as if the K paths involve at least E other users having a direct connection or relationship with the first user (e.g. friends of the first user) and/or if E second other users have a relationship with the candidate user (e.g. friends of the second user). By tuning the parameters K, L, and E of the candidate friend selection function, a tradeoff between privacy and utility may be achieved. In some implementations, the total number of paths parameter K is set to the value 10, the maximum path length parameter L is set to the value 3, and the minimum number of friends parameter E is set to the value 5.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces with a communications network (such as the network 106) to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronics system, game console, set-top box, or any other communication device that a user may use to access a network.

Each messaging client application 104 is able to communicate and exchange data with another messaging client application 104 and with the messaging server system 108 via the network 106. The data exchanged between the messaging client applications 104, and between a messaging client application 104 and the messaging server system 108, includes functions (e.g., commands to invoke functions) as well as payload data (e.g., text, audio, video, or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 106 or a portion of the network 106 may include a wireless or cellular network and the connection to the network 106 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evoltution (EDGE) technology, third-Generation Partnership Project (3GPP) including 3G, fourth-generation wireless (4G) networks, Universal Mobile Telecommunications System (UMTS), HighSpeed Packet Access (HSPA), Worldwide Interoperability for Microwave Access (WiMAX), Long-Term Evolution (LTE) standard, or others defined by various standard-setting organizations, other long-range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Programming Interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the application server 112, for possible access by another messaging client application 104; the setting of a collection of media data (e.g., story); the retrieval of a list of friends of a user of a client device 102; the retrieval of such collections; the retrieval of messages and content; the adding and deletion of friends to and from a social graph; the location of friends within a social graph; and the detecting of an application event (e.g., relating to the messaging client application 104).

The application server 112 hosts a number of applications and subsystems, including a messaging server application 114 and a social network system 116. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The social network system 116 supports various social networking functions and services, and makes these functions and services available to the messaging server application 114. To this end, the social network system 116 maintains and accesses an entity graph within the database 120. Examples of functions and services supported by the social network system 116 include the identification of other users of the messaging system 100 with whom a particular user has relationships or whom the user is "following," and also the identification of other entities and interests of a particular user.

Figure 2:
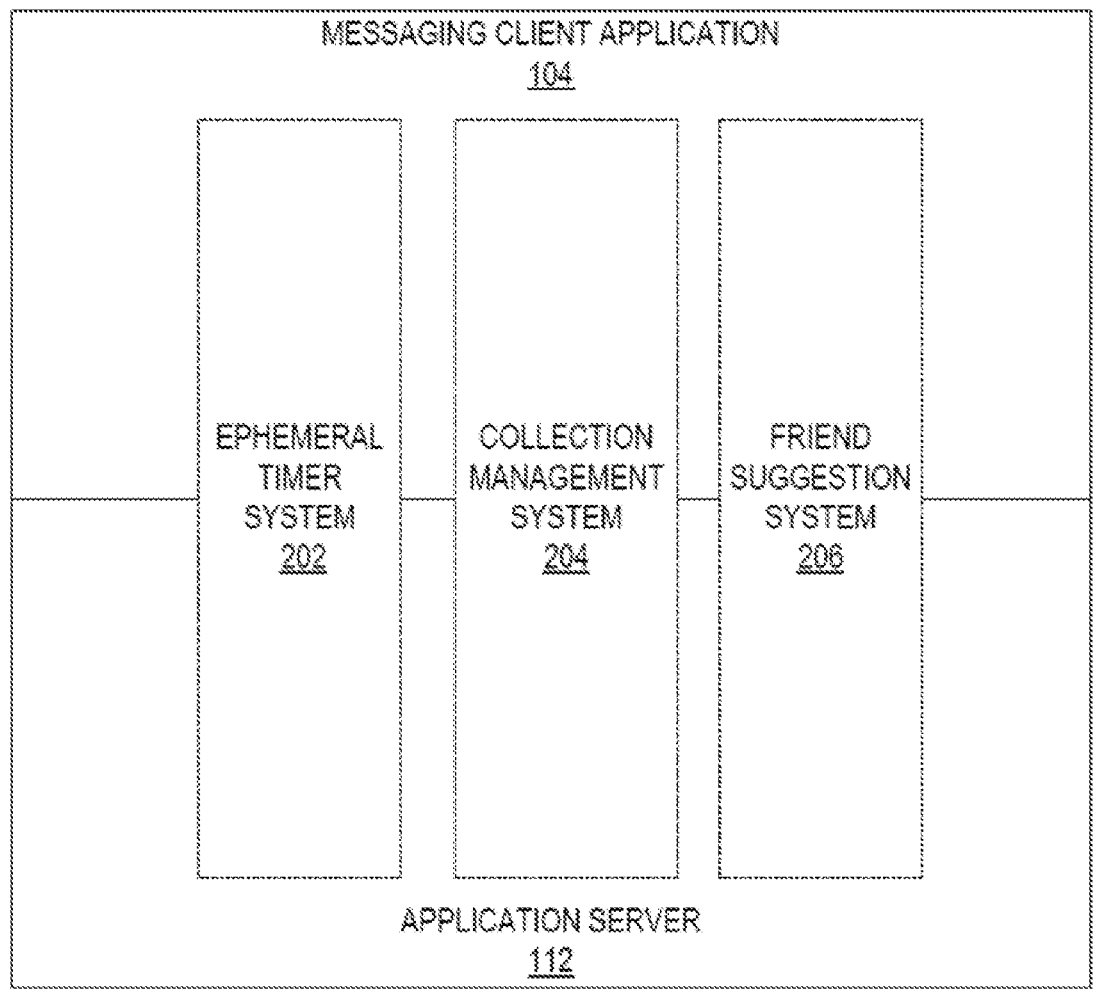
FIG. 2 is block diagram illustrating further details regarding the messaging system, according to some embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of subsystems, namely an ephemeral timer system 202, a collection management system 204, and a friends suggestion system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story, such as the story component 404 discussed below), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The friend suggestion system 206 may make friend suggestions to one or more users of the social network system 116. For example, the friend suggestion system may generate a list of friend suggestions for a particular user based on utility and privacy considerations. Expanding a user's list of friends on the social network may be desirable in that it may increase engagement of the user and the suggested friend on the social network. However, by suggesting friends to a user, some visibility is provided to the user receiving the suggestion. If the user receiving the suggestions has a malicious intent, such visibility may assist the user in exploiting the social network for nefarious ends. Thus, the friend suggestion system 206 may balance the desire to create a more engaging social network experience with the need to limit a malicious user's ability to inappropriately exploit the resources of the social network.

In some embodiments, the friend suggestion system 206 uses an entity graph 304 to generate a friend suggestion inventory. The friend suggestion inventory may be stored on database 120 and may be specifically associated with a given user on the social network. The friend suggestion inventory may include a list of candidate users who are indirectly connected to the given user and have been identified by the friend suggestion system 206 as candidates for the given user to befriend. Any one or multiple candidate users who are included in the friend suggestion inventory can be identified or presented to the given user in a list as suggested friends. The user can interact with the list to selectively send friend requests to any of the users on the list in order to form a direct connection with the candidate users. Prior to forming the direct connection with the candidate users, the given user is restricted and is prevented from accessing or viewing any or a portion of the content of profiles of the candidate users. After forming a direct connection with a given candidate user, such restricted content may become unrestricted which allows the given user to view the content of the profile. In certain embodiments, users are "directly" connected to each other on the social network when there exists a direct bi-directional path between the users.

Figure 3:
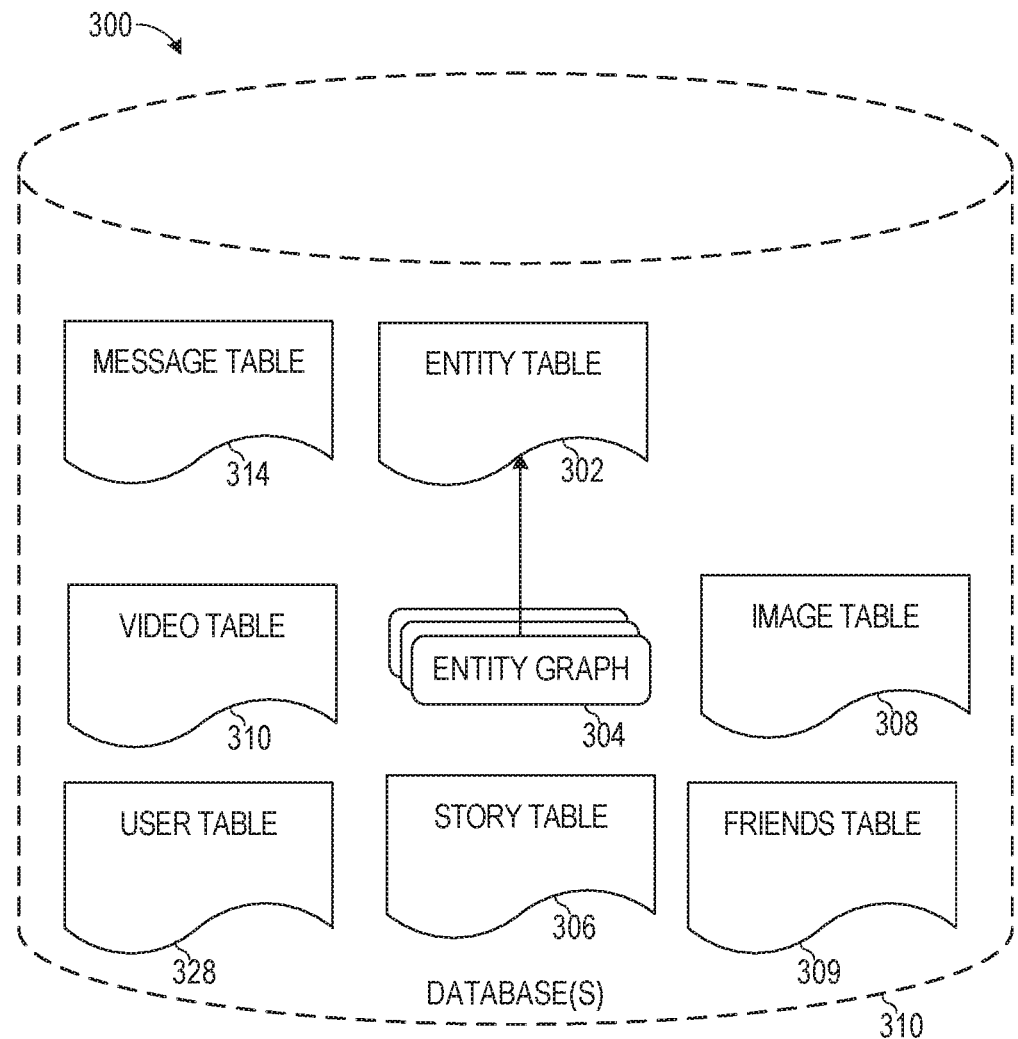
FIG. 3 is a schematic diagram illustrating data which may be stored in the database of the messaging server system, according to certain example embodiments.

FIG. 3 is a schematic diagram 300 illustrating data which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 614. An entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interested-based, or activity-based, merely for example. Specifically, entity graph 304 stores a directed graph representing direct and indirect connections between users within a particular social network and/or across multiple social network platforms.

As an example, the entity graph 304 (friend graph) is represented as a directed graph G=(V, E), where each vertex u ∈ V represents a user of the social network. A directed edge $$e = u \rightarrow v, e \in E$$

represents that user u added or is directly connected to v as a friend. If edges exist in both directions, such as both $$e_1 = u \rightarrow v \in E$$

and $$e_2 = u\text{-}v \in E$$

, this indicates that both u and v have added each other as friends which are represented using a bidirectional edge (e.g., $$e = u \longleftrightarrow v \in E$$

). The reach of the entity graph 304 can be parameterized by a distance l. For example, the friend network of u when l = 1 limits the friend network to u and u's friends. l = 2 includes the friends of friends of u as well. Users at a distance l + 1 are referred to as l-hop friends. Any user who is exactly 2 edges away from u is considered a friend-of-a-friend of u.

A user who is at a distance at least 2 from u is not already friends with u and thus may have an indirect connection with u. The social network may suggest such users as friend suggestions to u, whom may be referred to as the recipient or given user. Upon receiving a suggestion s, the recipient u may choose to send a friend request to s and create a unidirectional friend relationship. s receives this request and may choose to reciprocate and create a bidirectional friendship. According to some embodiments, only bidirectional friendships are considered when generating suggestions because such edges are more difficult for an adversary to create than unidirectional connections. After adding friends, users may also perform other activities to engage on the social network. The most common forms of engagement involve creating and sharing content with friends or interacting with friends' content (e.g., commenting on posts, liking posts, viewing videos or images, and so forth).

A path length between two users is measured based on how many other users in the graph are between the two users. Namely, first and second users in the graph may be indirectly connected via three other users. Specifically, for the first user to reach the second user, the first user's direct connection with a third user is traversed, the third user's direct connection with a fourth user is then traversed, and the third user's direct connection with a fifth user is then traversed who has a direct connection to the second user. Accordingly, such a path may have a length of four because four hops are needed for the first user to reach the second user.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., a user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and who are at a common location or event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

A user table 328 may store a list of users for the social network. Each user may be identified via a unique user identifier and/or user account name. The friends table 330 may identify friend relationships between users in the user table 328. In some aspects, the friends table 330 may be included in the entity graph 304. For example the fields table may include at least two columns, with a first column identifying a first user and the second column identifying a second user. When two users are identified in a single row of the friends table, those two users are friends. The friends table 330 may be used for access control in some aspects. For example, whether a first user in the user table 328 may access content of a second user in the user table 328 may depend on whether the two users are friends, as defined by the friends table 330. If the users are not friends, perhaps the content may not be accessed. If the two users are friends, then in some aspects the content may be accessed.

Figure 4:
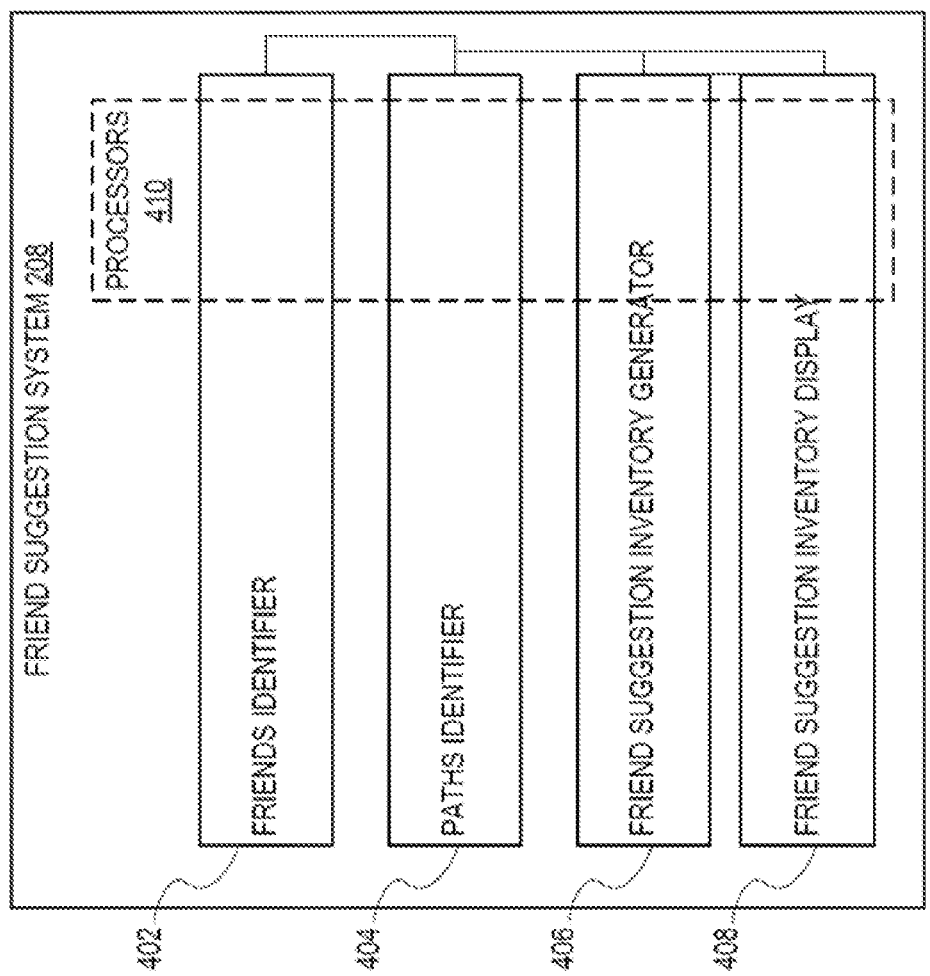
FIG. 4 is a block diagram illustrating functional components of a custom encoding system, according to certain example embodiments.

FIG. 4 is a block diagram illustrating functional components of the friend suggestion system 208 that forms part of the messaging system 100, according to some example embodiments. To avoid obscuring the disclosure with details and specific of well-known or conventional components and functionalities, various functional components (e.g., modules, engines, and databases) that are not germane to conveying an understanding of the disclosure have been omitted from FIG. 4. However, a skilled artisan will readily recognize that various additional functional components may be supported by the friend suggestion system 208 to facilitate additional functionality that is not specifically described herein. As shown, the friend suggestion system 208 includes a friends identifier 402, paths identifier 404, friends inventor generator 406, and a friend suggestion inventory display 408. The friends identifier 402 may identify one or more friends of a social network user. In some aspects, the friends identifier 402 may utilize the user table 328 and/or the friends table 330 to identify friends of a user. In some aspects, the friends identifier 402 may also identify a set of users that includes friends of friends of a user. Some functionality between the components of friend suggestion system 208 can be shared. In some embodiments, all of the functionality of one of the components shown in FIG. 4 can be performed by another of the components shown in FIG. 4.

The paths identifier 404 may identify paths between two users (e.g., a first user and a second user) of the social network. A path between two users may be defined as a linkage between two users that is established via friends of each of the two users. For example, if two users share a common friend, a path between the two users may run from the first user, to the common friend, and then to the second user and such a path may have length two hops. The paths identifier 404 may identify all paths between two users. In some cases, the two users may have no common friends, but friends of friends may have common friends, etc.

The friend suggestion inventory generator 406 may generate a set of candidate users to suggest to a given user as friends. The set of candidate users may be based, at least in part, on the paths identified by the paths identifier. The set of users may be further based on other factors. The set of candidate users may be based, at least in part, on one or more parameters (e.g., K, L, and/or E) of the candidate friend selection function. In some implementations, the one or more parameters are uniquely associated and generated for each user on the social network, a collection of users on the social network, or are common and the same for all the users on the social network. In some implementations, the one or more parameters are updated and changed dynamically over predetermined time intervals. In some implementations, the one or more parameters are updated and changed as new candidate users are identified for a given user. In some implementations, the one or more parameters are updated with random or pseudo-random numbers selected from a predetermined set of numbers.

In some embodiments, the friend suggestion inventory generator 406 may access the entity graph 304 that specifies connections between a plurality of users on the social network. The social network may include one platform, multiple platforms (each maintaining separate user accounts and profiles for its users), and/or user contact lists. Based on the entity graph 304, the friend suggestion inventory generator 406 identifies a first candidate user of the plurality of users on the social network that is indirectly connected to a given user of the plurality of users on the entity graph 304. For example, the friend suggestion inventory generator 406 selects a user who is directly connected to the given user on the social network and generates a set of candidate users by retrieving all or a predetermined number of the users on the social network who are directly or indirectly connected to the selected user. The friend suggestion inventory generator 406 may simultaneously or sequentially select a second user who is directly connected to the given user on the social network and add to the set of candidate users all or a predetermined number of the users on the social network who are directly or indirectly connected to the selected second user. The friend suggestion inventory generator 406 may select a candidate user from the set of candidate users randomly or pseudo-randomly as the identified first candidate user.

The friend suggestion inventory generator 406 computes a number of unique paths on the entity graph 406 between the first candidate user and the given user. For example, the friend suggestion inventory generator 406 identifies a first path in the directed graph from the first candidate user to the given user that is different from a second path in the directed graph from the first candidate user to the given user. In an implementation, the first path is different from the second path and is therefore unique when the first path includes an edge that connects the first candidate user to a first intermediate user directly or indirectly and the second path includes an edge that connects the first candidate user to a second intermediate user directly or indirectly, where the first and second intermediate users are different. Each path that is identified by the friend suggestion inventory generator 406 is added to a list of possible paths from the first candidate user to the given user.

The friend suggestion inventory generator 406 determines that the first candidate user satisfies suggestion criteria comprising that a number of unique paths exceeds a first threshold and that the unique paths include at least a minimum number of friends of the given user (e.g., a number of friends of the given user exceeds a threshold minimum number of friends) that are directly connected to the given user on the entity graph or at least a minimum number of friends of the first candidate user (e.g., a number of friends of the first candidate user exceeds a threshold minimum number of friends) that are directly connected to the first candidate user. The threshold minimum number of friends of the given user in the suggestion criteria can be the same as or different from the threshold minimum number of friends of the first candidate user in the suggestion criteria. For example, the friend suggestion inventory generator 406 may count how many unique paths have been identified and added to the list of possible paths. The friend suggestion inventory generator 406 obtains a first parameter K (e.g., threshold) of the function that is associated with the given user. The friend suggestion inventory generator 406 compares the counted number of unique paths to the first parameter to determine whether the total number of unique paths exceed the first parameter.

The friend suggestion inventory generator 406 determines that each path in the list of possible paths has a length (e.g., includes a number of edges) that is less than a second parameter L, (e.g., threshold) of the function that is associated with the given user. For example, the friend suggestion inventory generator 406 may obtain a first path that is in the list of possible paths and count the number of edges that connect two users within the path. If the number of edges is more than the second parameter, the friend suggestion inventory generator 406 removes the first path from the list of possible paths. For example, the friend suggestion inventory generator 406 may obtain a second path that is in the list of possible paths and count the number of edges that connect two users within the path. If the number of edges is less than the second parameter, the friend suggestion inventory generator 406 keeps the first path in the list of possible paths. In this way, the friend suggestion inventory generator 406 trims the paths that are in the list of possible paths based on their respective lengths being less than the second parameter.

The friend suggestion inventory generator 406 determines that the unique paths include a minimum number of friends of the given user that are directly connected to the given user on the entity graph. For example, the friend suggestion inventory generator 406 may obtain a first path that is in the list of possible paths and retrieve all of the users from the first path that are friends with, or have a direct connection, with the given user. The retrieved users are added to a common users list. The friend suggestion inventory generator 406 may obtain a second path that is in the list of possible paths and retrieve all of the users from the second path that are friends with, or have a direct connection, with the given user. The friend suggestion inventory generator 406 may determine whether any of the retrieved users are already included in the common users list. The friend suggestion inventory generator 406 adds any user from the retrieved users from the second path who is not already on the common users list to the common users list. The friend suggestion inventory generator 406 may repeat this process until all of the unique users who are friends with the given user and are included in the list of paths from the first candidate user to the given user have been analyzed. The friend suggestion inventory generator 406 obtains a third parameter E (e.g., threshold) of the function that is associated with the given user. The friend suggestion inventory generator 406 compares the number of users in the common users list to the second parameter to determine whether the number of users exceeds the third parameter.

In some embodiments, the friend suggestion inventory generator 406 determines that the unique paths include a minimum number of friends of the first candidate user that are directly connected to the first candidate user on the entity graph. For example, the friend suggestion inventory generator 406 may obtain a first path that is in the list of possible paths from the first candidate user to the given user and retrieve all of the users from the first path that are friends with, or have a direct connection, with the first candidate user. The retrieved users are added to a common users list. The friend suggestion inventory generator 406 may obtain a second path that is in the list of possible paths and retrieve all of the users from the second path that are friends with, or have a direct connection, with the first candidate user. The friend suggestion inventory generator 406 may determine whether any of the retrieved users are already included in the common users list. The friend suggestion inventory generator 406 adds any user from the retrieved users from the second path who is not already on the common users list to the common users list. The friend suggestion inventory generator 406 may repeat this process until all of the unique users who are friends with the first candidate user (and/or the given user) and are included in the list of paths from the first candidate user to the given user have been analyzed. The friend suggestion inventory generator 406 obtains the third parameter E (e.g., threshold) of the function that is associated with the given user. The friend suggestion inventory generator 406 compares the number of users in the common users list to the second parameter to determine whether the number of users exceeds the third parameter.

The friend suggestion inventory generator 406 adds the first candidate friend to a friend suggestion inventory for the given user in response to determining that the number of unique paths exceeds a first threshold, that the unique paths include a minimum number of friends of the given user that are directly connected to the given user, and/or a minimum number of friends of the first candidate user that are directly connected to the first candidate user on the entity graph 304, and/or that the lengths of the unique paths are less than a threshold. In some embodiments, once the first candidate friend is added to the friend suggestion inventory, the friend suggestion inventory generator 406 updates the one or more parameters of the function used to select and add candidate friends. Subsequently, the friend suggestion inventory generator 406 identifies a second candidate user who is indirectly connected to the given user and processes paths between the second candidate user and the given user to determine whether to add the second candidate user to the friend suggestion inventory.

In some embodiments, the friend suggestion inventory generator 406 may rank or assign priority values to each of the candidate friends in the friend suggestion inventory. The ranks or priority values may be generated or computed based on how well the parameters of the function were matched when computing the paths to the candidate friends. For example, a first candidate friend that is in the friend suggestion inventory may have a first path to the given user that is of a first length and includes three of the given user's friends. A second candidate friend that is in the friend suggestion inventory may have a second path to the given user that is of a second length, that is longer than the first length, and includes five of the given user's friends. In such cases, the friend suggestion inventory generator 406 may rank the second candidate friend higher or assign the second candidate friend a greater priority than the first candidate friend because the second candidate friend has a path with more friends of the given user than the path of the first candidate friend to the given user. Alternatively, the friend suggestion inventory generator 406 may rank the second candidate friend lower or assign the second candidate friend a lower priority than the first candidate friend because the second candidate friend has a longer path to the given user than the path of the first candidate friend to the given user. In another embodiment, the friend suggestion inventory generator 406 may rank the second candidate friend higher or assign the second candidate friend a greater priority than the first candidate friend because the second candidate friend has a greater number of total unique paths to the given user than the total number of unique paths of the first candidate friend to the given user.

Any other combination of number of paths, number of friends of the given user on the paths, and/or path lengths of the unique paths to the given user can be considered in assigning ranks or priorities to the candidate friends that are included in the friend suggestion inventory. In some cases, the candidate friends in the inventory are sorted based on the assigned ranks. A list of the candidate friends is presented to the given user according to the sorted order of the candidate friends from which the user can select one or more candidate friends to establish direct connections.

In some embodiments, the friend suggestion inventory generator 406 may first count how many friends or direct connections the given user has. The friend suggestion inventory generator 406 may compare the number of friends or direct connections the given user has to the one or more parameters of the candidate friend selection function, such as the third parameter E. If the number of friends is less than the third parameter of the candidate friend selection function, the friend suggestion inventory generator 406 may avoid or not perform the process of identifying candidate friends for the given user by analyzing paths as discussed above. Instead, the friend suggestion inventory generator 406 may retrieve a friend suggestion inventory from one or more of the friends or direct connections of the given user. The friend suggestion inventory generator 406 may identify top ranked or high priority candidate friends in the friend suggestion inventory. The friend suggestion inventory generator 406 may add a subset of the identified top ranked or high priority candidate friends to the friend suggestion inventory of given user to suggest as friends to the given user. After the given user forms additional friends or direction connections such that the total number of friends the given user has now exceeds the third parameter E, the friend suggestion inventory generator 406 may start generating and adding candidate friends to the given user's friend suggestion inventory based on paths to other users in the social network view the given user's friends.

The friend suggestion inventory display module 408 may display a list of friend suggestions based on the friend suggestion inventory of the friends inventory generator 406. The friend suggestion display module 408 may further receive input selecting one or more of the suggested friends, and update the friends table 330 based on the selections.

The above referenced functional components of the friend suggestion system 208 are configured to communicate with each other (e.g., via a bus, shared memory, a switch, or APIs). Collectively, these components facilitate friend suggestions to a user that provide increased engagement with the social network while mitigating privacy concerns.

As is understood by skilled artisans in the relevant computer and Internet-related arts, each functional component illustrated in FIG. 4 may be implemented using hardware (e.g., a processor of a machine) or a combination of logic (e.g., executable software instructions) and hardware (e.g., memory and the processor of a machine) for executing the logic. For example, any component included as part of the friend suggestion system 208 may physically include an arrangement of one or more processors 410 (e.g., a subset of or among one or more processors of a machine) configured to perform the operations described herein for that component. As another example, any component of the friend suggestion system 208 may include software, hardware, or both, that configure an arrangement of the one or more processors 410 to perform the operations described herein for that component. Accordingly, different components of the friend suggestion system 208 may include and configure different arrangements of such processors 410 or a single arrangement of such processors 410 at different points in time.

Furthermore, the various functional components depicted in FIG. 4 may reside on a single machine (e.g., a client device or a server) or may be distributed across several machines in various arrangements such as cloud-based architectures. Moreover, any two or more of these components may be combined into a single component, and the functions described herein for a single component may be subdivided among multiple components. Functional details of these components are described below with respect to at least FIGS. 5-10.

Figure 5:
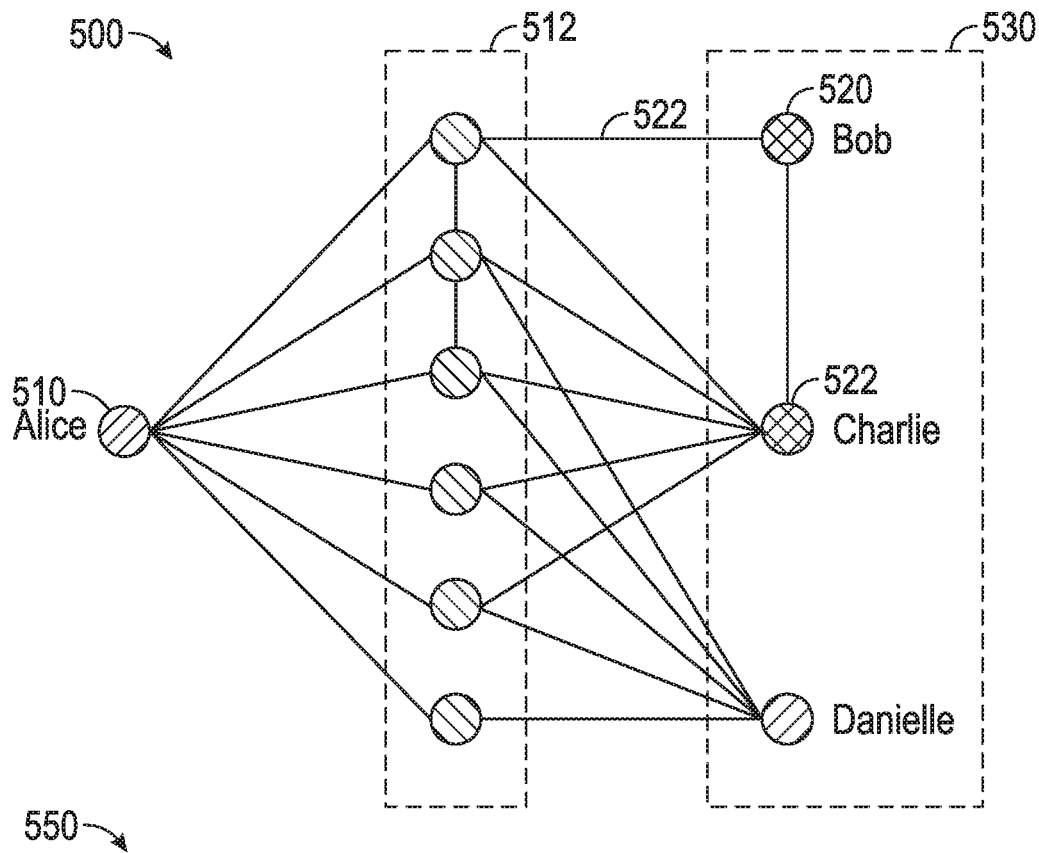
FIG. 5 shows an example friend graph and which users are added to the suggestion inventory for certain parameters of the process, according to certain example embodiments.

FIG. 5 shows an example friend graph 500 according to some embodiments. The friend graph 500 shows that the given user 510 under consideration (e.g., Alice) has a direct connection with a plurality of friends 512 and an indirect connection (via each of the friends 512) with three users: Bob, Danielle, and Charlie. In embodiments where K=10, L=3, E=5, Bob is not an approved suggestion because there are 7 (<10) paths to Alice and 2(<5) edges incident to Bob on paths between Alice and Bob. Charlie, however, is an approved suggestion because there are 10 (>=10) paths to Alice and 5 (>=5) direct friends of Alice and Charlie on the paths.

In particular, in the example embodiment of FIG. 5, the friend suggestion inventory generator 406 may retrieve the friend graph 500 from database 120 for the given user 510. The friend suggestion inventory generator 406 iterates through each of the given user's 510 friends 512 to retrieve each of the direct and indirect connections of the friends 512 to form a set of potential candidate users 530. The friend suggestion inventory generator 406 determines for each candidate user in the set of potential candidate user 530, whether a given candidate user satisfies suggestion criteria. If a given candidate user satisfies the suggestion criteria, the friend suggestion inventory generator 406 adds the given candidate user to the friends suggestion inventory. If a given candidate user fails to satisfy any criterion or collection of criteria in the suggestion criteria, the friend suggestion inventory generator 406 prevents the given candidate user from being added to the friends suggestion inventory.

In the example embodiment of FIG. 5, the friend suggestion inventory generator 406, may first select a first candidate user 520 (e.g., Bob) for processing to determine whether a first criterion of the suggestion criteria, such as paths from the first candidate user 520 to the given user 510 satisfy one or more parameters of the candidate friend selection function. Specifically, the friend suggestion inventory generator 406 may identify each path through the friend graph 500 that leads from the first candidate user 520 to the given user 510. Then the friend suggestion inventory generator 406 may compute how many edges 522 are on each of the paths. In an implementation, in the example embodiment of FIG. 5, the friend suggestion inventory generator 406 stores this path information in a table 550. The friend suggestion inventory generator 406 may retrieve the path length parameter for the candidate selection function for the given user 510 and determine that the path length parameter is 3. The friend suggestion inventory generator 406 may exclude from the table 550 any path from the first candidate user 520 to the given user 510 that includes more than 3 edges.

In the example embodiment of FIG. 5, the friend suggestion inventory generator 406 may determine whether a second criterion of the suggestion criteria is satisfied, such as by computing how many of the given user's 510 friends 512 that are unique friends are included in the paths (that have less than 3 edges) and/or how many of the first candidate user's 520 friends that are unique are on the paths from the first candidate user 520 to the given user 510. In the example embodiment of FIG. 5, the friend suggestion inventory generator 406 may retrieve the minimum friends parameter for the candidate selection function for the given user 510 (e.g., Alice) and determine that the minimum friends parameter is 5. The friend suggestion inventory generator 406 may compare the total number of unique friends that are included in the paths from the first candidate user 520 (e.g., Bob) to the given user 510 (e.g., Alice) to the minimum friends parameter. In response to determining that the total number of unique friends is less than the minimum friend parameter, the friend suggestion inventory generator 406 may prevent the addition of the first candidate user 520 to the friend suggestion inventory. In some cases, the friend suggestion inventory generator 406 may determine that only four unique friends of the given user's 510 friends 512 are included in the paths having less than 3 edges. Because four unique friends is less than five minimum friends, the friend suggestion inventory generator 406 prevents the addition of the first candidate user 520 to the friend suggestion inventory of the given user 510. In friends graph 500, the friend suggestion inventory generator 406 may determine that five unique friends 512 of the given user's 510 are included in the paths having less than 3 edges. Because five unique friends is equal to the five minimum friends threshold, the friend suggestion inventory generator 406 adds the first candidate user 520 to the friend suggestion inventory of the given user 510.

In the example embodiment of FIG. 5, the friend suggestion inventory generator 406 may determine whether a third criterion of the suggestion criteria is satisfied, such as by computing how total paths of lengths less than 3 are identified from the first candidate user 520 to the given user 510. Particularly, the friend suggestion inventory generator 406 may determine that there exist 7 total paths of lengths less than 3 from the first candidate user 520 to the given user 510. The friend suggestion inventory generator 406 may retrieve the minimum number of paths parameter for the candidate selection function for the given user 510 and determine that the minimum number of paths parameter is 10. The friend suggestion inventory generator 406 may compare the total number of paths that are identified from the first candidate user 520 to the given user 510 to the minimum number of paths parameter. In response to determining that the total paths, 7, is less than the minimum number of paths parameter, 10, the friend suggestion inventory generator 406 may prevent the addition of the first candidate user 520 to the friend suggestion inventory of the given user 510.

In the example embodiment of FIG. 5, the friend suggestion inventory generator 406 may next select a second candidate user 522 (e.g., Charlie) for processing to determine whether paths from the second candidate user 522 to the given user 510 satisfy the suggestion criteria, such as one or more parameters of the candidate friend selection function. Specifically, the friend suggestion inventory generator 406 may identify each path through the friend graph 500 that leads from the second candidate user 522 to the given user 510. Then, the friend suggestion inventory generator 406 may compute how many edges 522 are on each of the paths. In an implementation, the friend suggestion inventory generator 406 stores this path information in a table 550. The friend suggestion inventory generator 406 may retrieve the path length parameter for the candidate selection function for the given user 510 and determine that the path length parameter is 3. The friend suggestion inventory generator 406 may exclude from the table 550 any path from the second candidate user 522 to the given user 510 that includes more than 3 edges.

In the example embodiment of FIG. 5, the friend suggestion inventory generator 406 may then compute how many of the given user's 510 friends 512 that are unique friends are included in the paths (that have less than 3 edges) and/or how many of the second candidate user 522 friends that are unique are on the paths from the second candidate user 522 to the given user 510. The friend suggestion inventory generator 406 may retrieve the minimum friends parameter for the candidate selection function for the given user 510 and determine that the minimum friends parameter is 5. The friend suggestion inventory generator 406 may compare the total number of unique friends that are included in the paths from the second candidate user 522 to the given user 510 to the minimum friends parameter. In response to determining that the total number of unique friends is greater than the minimum friend parameter, the friend suggestion inventory generator 406 may add the second candidate user 522 to the friend suggestion inventory. Particularly, the friend suggestion inventory generator 406 may determine that five unique friends 512 of the given user's 510 friends are included in the paths having less than 3 edges. Because five unique friends is equal to the five minimum friends, the friend suggestion inventory generator 406 adds the second candidate user 522 to the friend suggestion inventory of the given user 510.

In the example embodiment of FIG. 5, the friend suggestion inventory generator 406 may compute how many total paths of lengths less than 3 are identified from the second candidate user 522 to the given user 510. Particularly, the friend suggestion inventory generator 406 may determine that there exist 10 total paths of lengths less than 3 from the second candidate user 522 to the given user 510. The friend suggestion inventory generator 406 may retrieve the minimum number of paths parameter for the candidate selection function for the given user 510 and determine that the minimum number of paths parameter is 10. The friend suggestion inventory generator 406 may compare the total number of paths that are identified from the first candidate user 520 to the given user 510 to the minimum number of paths parameter. In response to determining that the total paths, 10, is equal to the minimum number of paths parameter, 10, the friend suggestion inventory generator 406 may add the second candidate user 522 to the friend suggestion inventory of the given user 510.

Figure 6:
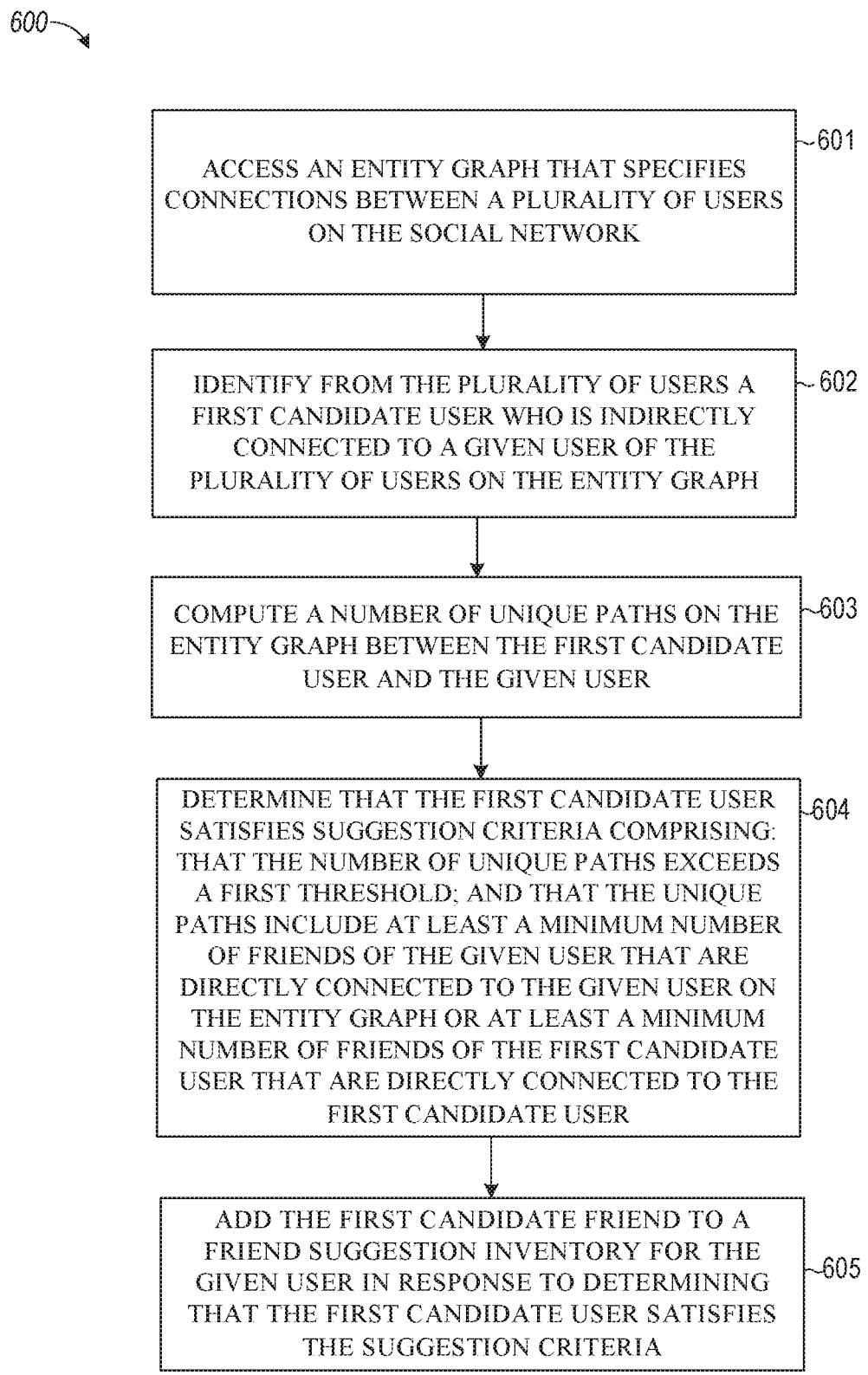
FIG. 6 is a flowchart of one method of generating a friend suggestion inventory for a user of a social network, according to certain example embodiments.

FIG. 6 is a flowchart illustrating example operations of the friend suggestion inventory generator 406 in performing process 600, according to example embodiments. The process 600 may be embodied in computer-readable instructions for execution by one or more processors such that the operations of the process 600 may be performed in part or in whole by the functional components of the friend suggestion system 208; accordingly, the process 600 is described below by way of example with reference thereto. However, in other embodiments, at least some of the operations of the process 600 may be deployed on various other hardware configurations. The process 600 is therefore not intended to be limited to the friend suggestion system 208 and can be implemented in whole, or in part, by any other component. Some or all of the operations of process 600 can be in parallel, out of order, or entirely omitted.

At operation 601, the friend suggestion system 208 accesses an entity graph that specifies connections between a plurality of users on the social network.

At operation 602, the friend suggestion system 208 identifies from the plurality of users a first candidate user who is indirectly connected to a given user of the plurality of users on the entity graph.

At operation 603, the friend suggestion system 208 computes a number of unique paths on the entity graph between the first candidate user and the given user.

At operation 604, the friend suggestion system 208 determines that the first candidate user satisfies suggestion criteria comprising: that the number of unique paths exceeds a first threshold; and that the unique paths include at least a minimum number of friends of the given user that are directly connected to the given user on the entity graph or at least a minimum number of friends of the first candidate user that are directly connected to the first candidate user.

At operation 605, the friend suggestion system 208 adds the first candidate friend to a friend suggestion inventory for the given user in response to determining that the first candidate user satisfies the suggestion criteria.

Some embodiments use L as a heuristic to approximate the background information of the adversary. All friends of a user who lie on a path of length at most L from the user to a suggestion are associated with the same background information as the suggestion with respect to the user. For a suggestion, higher value for the parameter L may increase the number of friends who are similar to the suggestion from the perspective of the adversary. As a result, a higher value of the parameter L may weaken the adversary model by assuming less granular background information. The candidate friend suggestion function may require that at least E friends share background information with any suggestion. Higher values of parameters K and E may require more paths and intermediate users between a user and a suggestion, and thus require that the adversary create more fake accounts and friendships to game the strategy. As a result, higher K and E generally lead to higher privacy.

The parameter L plays a role in trading off privacy, inventory opportunity, refresh frequency, and computational efficiency. For example, a relatively higher value of parameter L may weaken an adversary model by assuming less granular background information. Thus, privacy may decrease with increasing the value of parameter L. Furthermore, since increasing the value of parameter L also increases the number of users associated with the same background information as a suggestion, it may become easier to surpass the parameter E threshold. Moreover, since higher values for parameter L means counting all paths of length up to L, it also may become easier to surpass the K threshold. As a result, the inventory opportunity may increase with L.

Increasing the value of parameter L means counting longer paths between a candidate and a recipient. Counting longer paths incur higher time complexity, thereby making the suggestion generation process more computationally expensive. Accounting for these factors, some embodiments utilize a parameter L value of three as a compromise between privacy and utility. On the one hand, it may weaken the adversary model and increases the computational complexity (compared to L=2), but it also expands the inventory and allows for inventory refreshes in real-time.

The parameter value E enforces a lower bound on the number of friends of the recipient that share background information with a suggestion candidate. A higher E may also increase the number of fake accounts and relationships the adversary has to create. Thus, privacy generally increases with values of parameter E. Higher E also increases the connectedness threshold of a user and a suggestion, thereby improving the quality of suggestions. However, it may also require the user to have at least E friends, which may reduce the inventory size. Accounting for these factors, some embodiments use an E value of 3. This value may provide uncertainty of at least 3 friends for a 2hop friend suggestion.

A higher value for parameter K may require more edges to satisfy the requirement for a candidate to be selected as a suggested friend or to be added to the suggested friends inventory. It may increase the number of edges an adversarial user has to create with the targeted victims. Thus, higher values for parameter K increases the privacy of the strategy. Higher values for parameter K also increases the connectedness threshold of a user and a suggestion, thereby improving the quality of suggestions. However, higher value for parameter K also reduces the inventory size, since it requires more paths between a user and a suggestion.

As an example, when K=10, L=3, and E=3, an adversary may need to create six fake accounts and two fake friendships to the victims to discover whether the victims are friends with each other. The higher the K and E, the more interconnected accounts the adversary has to create to infer a friend relationship.

Figure 7:
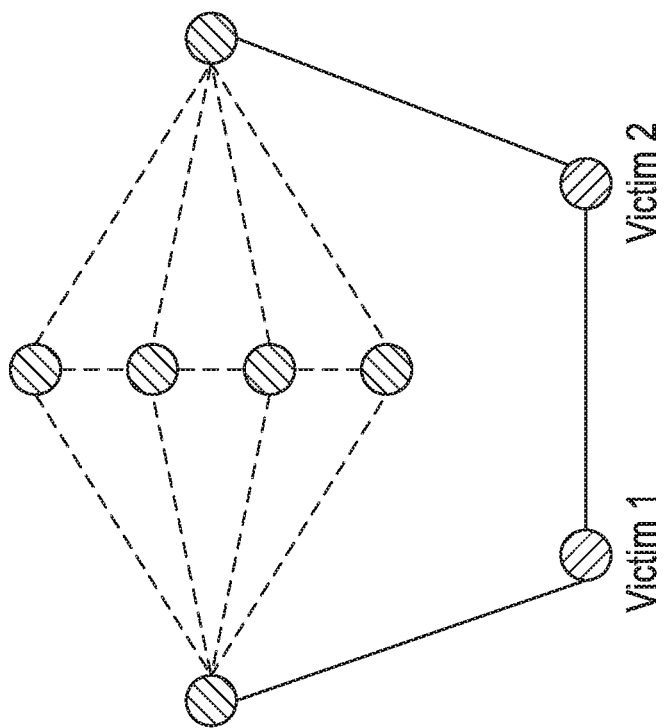
FIG. 7 shows another friend graph that an adversarial user would have to create to infer a friend relationship between two victim users, according to certain example embodiments.

FIG. 7 shows another friends graph that may represent friend relationships in one or more of the disclosed embodiments. The friends graph of FIG. 7 shows six fake accounts and two fake friendships an adversary has to create to uncover the friendship between the two victims. Taking these attacks and the general effect of K on privacy and utility into account, some embodiments select K that is greater than 10 to preserve privacy of the users and avoid such an attack.

In some aspects, real time inventory refreshes may be performed when generating a friend suggestion user interface. To balance computational efficiency and benefit new users, some embodiments may perform a periodic refresh of a user's friend suggestion inventory. In some aspects, the refresh may be performed hourly, daily, or weekly. In some aspects, this strategy may be applied to a first set of users having greater than or equal to a threshold number of friends. For example, in some aspects, the threshold may be ten. The first set of users may be assigned a first periodic interval for refreshing, such as the hourly, daily, or weekly interval suggested above.

In these embodiments, if a second set of users has less than the threshold number of friends, a refresh of the friend suggestion inventory may be performed when the user adds a friend. A second periodic interval for refresh of the friends inventory may also be performed for this second set of users in some aspects, especially if a refresh was not performed in response to a user of the second set adding a friend in the previous refresh period. The second periodic refresh period for this second set of users may be different than the first periodic refresh interval for the first set of users, and may be shorter in some aspects. For example, in some aspects, the first periodic refresh interval may be daily while the second periodic refresh period may be hourly.

Figure 8:
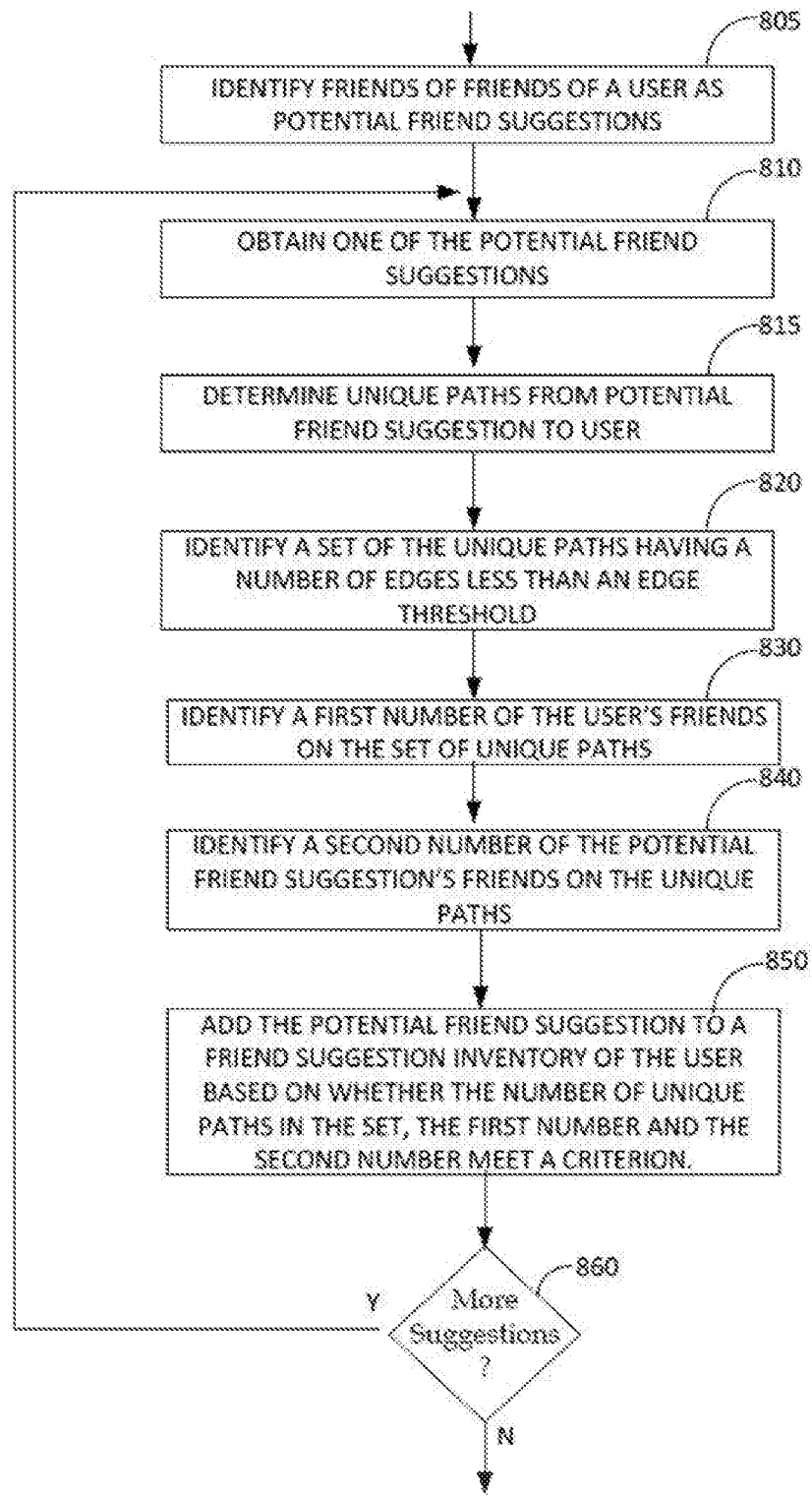
FIG. 8 is a flowchart of one method of generating a friend suggestion inventory for a user of a social network, according to certain example embodiments.

FIG. 8 is a flowchart of one method of generating a friend suggestion inventory for a user of a social network. In some aspects, one or more of the functions discussed below may be performed by hardware processing circuitry. For example, instructions stored in an electronic memory may configure hardware processing circuitry to perform one or more of the functions discussed below.

In block 805, friends of friends of a first user are identified. In some aspects, block 805 may process the friends table 330 to identify the friends of friends. The friends of friends may be referred to as a first set of users.

In block 810, one of the users identified as a friend of a friend of the first user is obtained from the first set of users.

In block 815, unique paths from the potential friend to the first user are identified. For example, as described above with respect to FIG. 5, paths between two users may run through one or more other users that may be friends of one or both of the users, or neither of the users. The paths represent unbroken chains of friend relationships between the two users.

In block 820, a set of the unique paths having a number of edges less than an edge threshold (or otherwise meeting a criterion) are identified. In some aspects, paths with three or fewer edges are included in the set, but this may vary by embodiment.

In block 830, a first number of the first user's friends included within the set of unique paths is identified.

In block 840, a second number of the suggested user's friends included in the set of unique paths is identified.

In block 850, the potential friend is added to a friend suggestion inventory of the first user based on whether the number of unique paths, the first number, and the second number meet a criterion. In some aspects, the number of unique paths in the set of unique paths must be greater than or equal to a first threshold (e.g., 10) for the criterion to be met. The first number may need to be greater than a second threshold (e.g., 5) for the criterion to be met in some aspects. The second number may need to be greater than a third threshold (e.g., 5) for the criterion to be met in some aspects.

Decision block 860 evaluates whether additional potential friends are to be evaluated. If so, processing returns to block 820, otherwise, the friend suggestion inventory be completed. Alternatively, blocks 810-860 may be repeated, but instead of operating on a set of friends of friends of the first user, a second set comprised of friends of friends of friends of the first user may be evaluated by process 800, and users identified from this set that meet the criterion of block 850 may also be added to the friend suggestion inventory of the first user.

After the friend suggestion inventory has been determined, a user interface may be displayed to the first user that displays the first user's friend suggestion inventory. The user interface may also be configured to receive input selecting one or more of the users in the displayed friend suggestion inventory. Upon selection, some aspects may add the selected users to the first user's friend list. The friends list may be stored in the friends table 330, and be represented by a set of users in rows of the friends table 330 that also identify the first user. In other aspects, a message may be sent to each of the selected users asking if that user accepts becoming a friend of the first user. Access control of content of the first user may be based, in part, on friend relationships of the first user. Thus, if the first user becomes friends with one of the users in the friend suggestion inventory, then that new user may be provided with enhanced access to content owned by the first user relative to other users who are not friends with the first user.

Software Architecture

Figure 9:
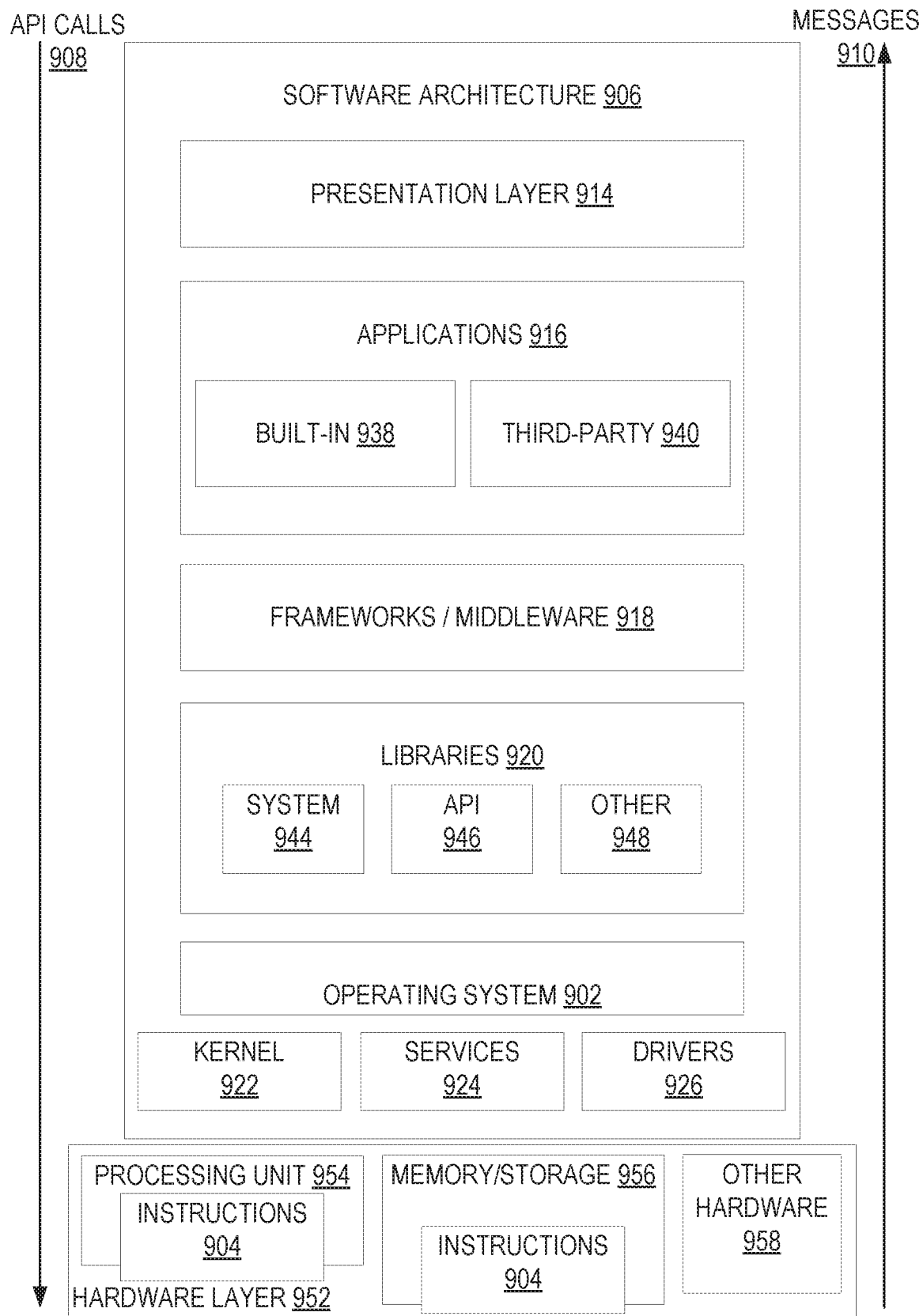
FIG. 9 is a block diagram illustrating an example software architecture, which may be used in conjunction with various hardware architectures herein described.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as a machine 1000 of FIG. 10 that includes, among other things, processors 904, memory/storage 906, and I/O components 918. A representative hardware layer 952 is illustrated and can represent, for example, the machine 1000 of FIG. 10. The representative hardware layer 952 includes a processing unit 954 having associated executable instructions 904. The executable instructions 904 represent the executable instructions of the software architecture 906, including implementation of the methods, components, and so forth described herein. The hardware layer 952 also includes memory and/or storage 956, which also have the executable instructions 904. The hardware layer 952 may also comprise other hardware 958.

As used herein, the term "component" may refer to a device, a physical entity, or logic having boundaries defined by function or subroutine calls, branch points, APIs, and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or include, any circuit or virtual circuit (a physical circuit emulated by logic executing on an actual processor) that manipulates data values according to control signals (e.g., "commands," "op codes," "machine code," etc.) and that produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a RadioFrequency Integrated Circuit (RFIC), or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive a response as messages 910. The layers illustrated are representative in nature and not all software architectures have all layers. For example, some mobile or special-purpose operating systems may not provide a frameworks/middleware 918 layer, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than by interfacing directly with the underlying operating system 902 functionality (e.g., kernel 922, services 924, and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media formats such as MPEG4, H0.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 provide a higher-level common infrastructure that may be used by the applications 916 and/or other software components/modules. For example, the frameworks/middleware 918 may provide various graphic user interface (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. The third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as the operating system 902) to facilitate functionality described herein.

The applications 916 may use built-in operating system functions (e.g., kernel 922, services 924, and/or drivers 926), libraries 920, and frameworks/middleware 918 to create user interfaces to interact with users of the system. Alternatively, or additionally, in some systems interactions with a user may occur through a presentation layer, such as the presentation layer 914. In these systems, the application/component "logic" can be separated from the aspects of the application/component that interact with a user.

Exemplary Machine

Figure 10:
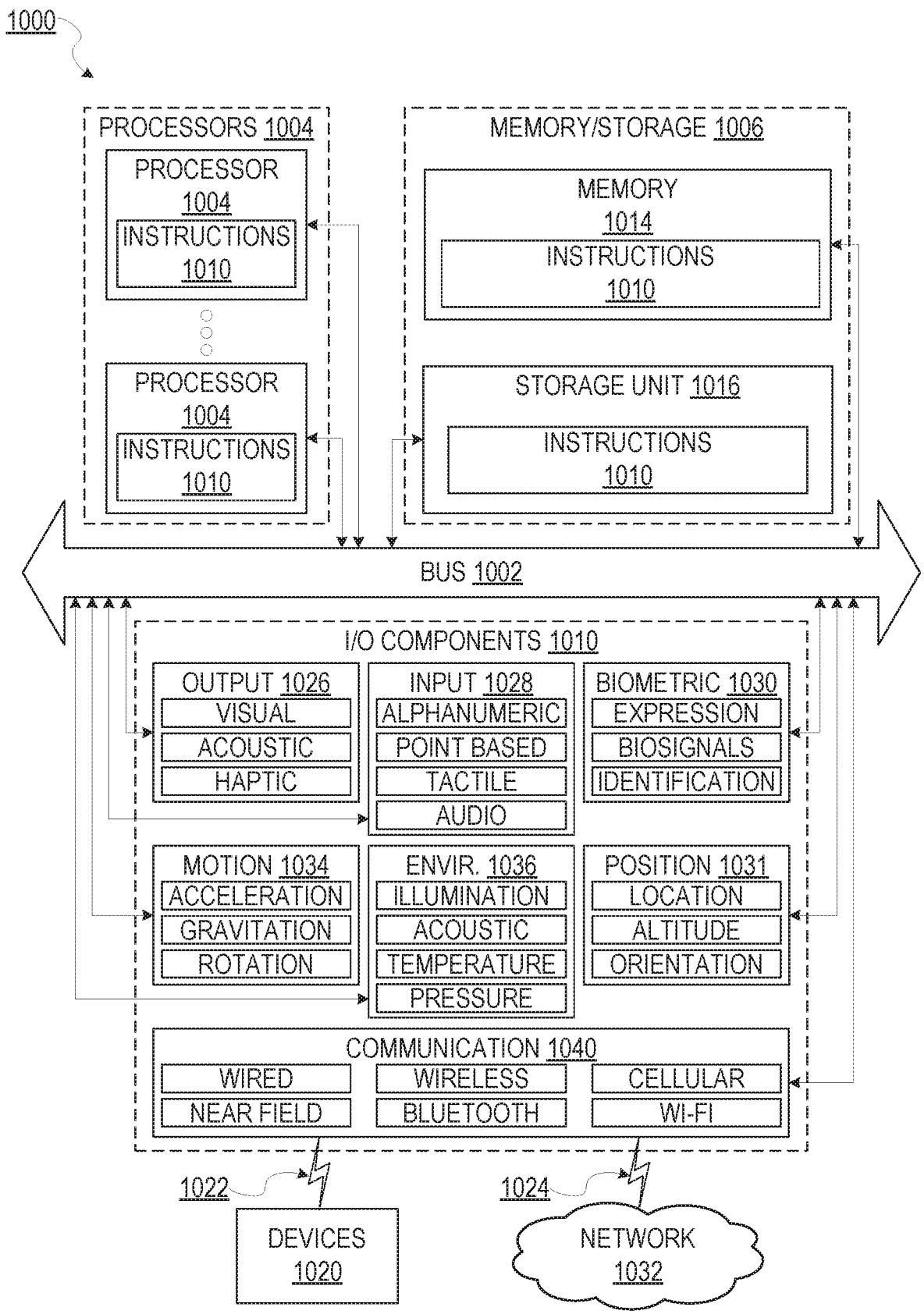
FIG. 10 is a block diagram illustrating exemplary components of a machine, according to certain example embodiments.

FIG. 10 is a block diagram illustrating exemplary components (also referred to herein as "modules") of a machine 1000. In some aspects, the machine is configured to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of the processors 1004 are examples of machine-readable media. In some aspect, the processors 202 and processors 1004 may be the same processors.

As used herein, the term "machine-readable medium," "computer-readable medium," or the like may refer to any component, device, or other tangible medium able to store instructions and data temporarily or permanently. Examples of such media may include, but are not limited to, random-access memory (RAM), read-only memory (ROM), buffer memory, flash memory, optical media, magnetic media, cache memory, other types of storage (e.g., Electrically Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes transitory signals per se.

The I/O components 1018 may include a wide variety of components to provide a user interface for receiving input, providing output, producing output, transmitting information, exchanging information, capturing measurements, and so on. The specific I/O components 1018 that are included in the user interface of a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting.

In various exemplary embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like. The input components 1028 may also include one or more image-capturing devices, such as a digital camera for generating digital images and/or video.

In further exemplary embodiments, the I/O components 1018 may include biometric components 1030, motion components 1034, environment components 1036, or position components 1038, as well as a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1034 may include acceleration sensor components (e.g., accelerometer), gravitation sensor components, rotation sensor components (e.g., gyroscope), and so forth. The environment components 1036 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via a coupling 1024 and a coupling 1022 respectively. For example, the communication components 1040 may include a network interface component or other suitable device to interface with the network 1032. In further examples, the communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multidimensional bar codes such as Quick Response (QR) code, Aztec code, Data Matrix, Dataglyph, MaxiCode, PDF4111, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting an NFC beacon signal that may indicate a particular location, and so forth.

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or any combination of the elements A, B, and C may be present in a single embodiment; for example, A and B, A and C, B and C, or A and B and C may be present.

Changes and modifications may be made to the disclosed embodiments without departing from the scope of the present disclosure. These and other changes or modifications are intended to be included within the scope of the present disclosure, as expressed in the following claims.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

We claim:

1. A method of generating a friend suggestion inventory in a social network, the method comprising:
    accessing, by one or more processors, an entity graph that specifies connections between a plurality of users on the social network;
    selecting a particular user of the plurality of users who is directly connected to a given user on the social network;
    generating a set of candidate users by retrieving a predetermined number of users who are connected to the selected particular user;
    randomly or pseudo-randomly, selecting from the set of candidate users, a first candidate user;
    identifying a set of unique paths on the entity graph between the first candidate user and the given user, the set of unique paths comprising a first path having a first number of edges between the first candidate user and the given user and a second path having a second number of edges between the first candidate user and the given user, the second path being different from the first path;
    computing, by the one or more processors, a quantity of unique paths by counting how many unique paths are included in the set of unique paths between the first candidate user and the given user;
    determining, by the one or more processors, that the first candidate user satisfies suggestion criteria comprising:
        that the quantity of unique paths exceeds a first threshold; and
        that the set of unique paths include at least a minimum number of friends of the given user that are directly connected to the given user on the entity graph or at least a minimum number of friends of the first candidate user that are directly connected to the first candidate user; and
    adding, by the one or more processors, the first candidate user to the friend suggestion inventory for the given user in response to determining that the first candidate user satisfies the suggestion criteria; and
    comparing a quantity of friends of the given user to a threshold number of friends; and
    selecting a periodic interval at which to regenerate the friend suggestion inventory based on a result of comparing the quantity of friends of the given user to the threshold number of friends.

2. The method of claim 1, wherein each of the friends of the given user has an edge in the entity graph that flows in both directions between the given user and the respective friend, further comprising:
    computing, for each of the set of unique paths, a number of edges of each of the unique paths;
    excluding, from the quantity of unique paths, a given one of the set of unique paths for which the computed number of edges exceeds an edge threshold value.

3. The method of claim 2, wherein determining that the quantity of unique paths exceeds the first threshold is performed after excluding the given one of the set of unique paths, further comprising:
    selecting a second candidate user from the set of candidate users;
    identifying a first path between the first candidate user and the given user, the first path having a first length and a first quantity of friends of the given user; and
    identifying a second path between the second candidate user and the given user, the second path having a second length, longer than the first length, and a second quantity of friends of the given user, larger than the first quantity.

4. The method of claim 3, further comprising:
    ranking the second candidate user higher than the first candidate user in response to determining that the second path has a larger quantity of friends of the given user than the first quantity of the first path;
    sorting the friend suggestion inventory as a result of ranking the second candidate user higher than the first candidate; and
    displaying the friend suggestion inventory to the given user.

5. The method of claim 3, further comprising:
    ranking the second candidate user lower than the first candidate user in response to determining that the second path between the second candidate user and the given user is of a longer length than the first length of the first path even though the second path has a larger quantity of friends of the given user than the first quantity of the first path;
    sorting the friend suggestion inventory as a result of ranking the second candidate user lower than the first candidate; and
    displaying the friend suggestion inventory to the given user.

6. The method of claim 3, further comprising:
    ranking the second candidate user higher than the first candidate user in response to determining that there exist a greater number of unique paths between the given user and the second candidate user than a total number of unique paths between the first candidate user and the given user;

sorting the friend suggestion inventory as a result of ranking the second candidate user higher than the first candidate; and displaying the friend suggestion inventory to the given user.

7. The method of claim 1, further comprising:

identifying a second candidate user of the plurality of users on the social network that is indirectly connected to the given user;

computing a second number of unique paths on the entity graph between the second candidate user and the given user;

determining that the second number of unique paths fails to exceed the first threshold; and preventing the second candidate user from being added to the friend suggestion inventory in response to determining that the second number of unique paths fails to exceed the first threshold.

8. The method of claim 1, further comprising:

identifying a second candidate user of the plurality of users on the social network that is indirectly connected to the given user;

computing a second number of unique paths on the entity graph between the second candidate user and the given user; and for each of the paths in the second number of unique paths:

selecting a first of the second number of unique paths;

determining that the first of the second number of unique paths includes a first friend of the given user that is directly connected to the given user on the entity graph;

forming a set of unique friends of the given user that are included in the second number of unique paths;

determining that the first friend is not included in the set of unique friends; and adding the first friend to the set of unique friends in response to determining that the first friend is not included in the set of unique friends.

9. The method of claim 8, further comprising:

counting the number of unique friends that are in the set of unique friends;

determining that number of unique friends fails to exceed a minimum number of friends of the given user; and preventing the second candidate friend from being added to the friend suggestion inventory in response to determining that the second number of unique paths fails to exceed the first threshold.

10. The method of claim 1, wherein determining that the unique paths include at least the minimum number of friends of the given user that are directly connected to the given user on the entity graph comprises:

for each of the set of unique paths:

selecting a first of the set of unique paths;

determining that the first unique path includes a first friend of the given user that is directly connected to the given user on the entity graph;

forming a set of unique friends of the given user that are included in the set of unique paths;

determining that the first friend is not included in the set of unique friends; and adding the first friend to the set of unique friends in response to determining that the first friend is not included in the set of unique friends;

counting the number of unique friends that are in the set of unique friends; and determining that number of unique friends exceeds the minimum number of friends of the given user.

11. The method of claim 1, further comprising regenerating the friend suggestion inventory in response to the given user adding a new friend forming a new direct connection between the given user and the new friend on the entity graph.

12. The method of claim 1, wherein the periodic interval is selected to be a first value in response to determining that the quantity of friends of the given user transgress the threshold number of friends, and wherein the periodic interval is selected to be a second value, different from the first value, in response to determining that the quantity of friends of the given user fails to transgress the threshold number of friends.

13. The method of claim 1 further comprising restricting the given user from accessing a list of users of the plurality of users that are directly connected to the friends of the given user and are indirectly connected to the given user.

14. The method of claim 1, wherein the entity graph represents connections between users across multiple platforms and multiple social networks, wherein the platforms include contact lists of the users.

15. The method of claim 1, further comprising randomly or pseudo-randomly generating the minimum number.

16. The method of claim 15, wherein the first threshold or the minimum number is adjusted periodically.

17. The method of claim 15, wherein the first threshold or the minimum number is adjusted when unique paths between a second candidate user who is indirectly connected to the given user are processed to determine whether to add the second candidate user to the friend suggestion inventory.

18. A system comprising:

a hardware processor; and a memory storing instructions that, when executed by the hardware processor, configure the hardware processor to perform operations comprising:

accessing an entity graph that specifies connections between a plurality of users on a social network;

selecting a particular user of the plurality of users who is directly connected to a given user on the social network;

generating a set of candidate users by retrieving a predetermined number of users who are connected to the selected particular user;

randomly or pseudo-randomly, selecting from the set of candidate users, a first candidate user;

identifying a set of unique paths on the entity graph between the first candidate user and the given user, the set of unique paths comprising a first path having a first number of edges between the first candidate user and the given user and a second path having a second number of edges between the first candidate user and the given user, the second path being different from the first path;

computing a quantity of unique paths by counting how many unique paths are included in the set of unique paths between the first candidate user and the given user;

determining that the first candidate user satisfies suggestion criteria comprising:

that the quantity of unique paths exceeds a first threshold; and that the set of unique paths include at least a minimum number of friends of the given user that are directly connected to the given user on the entity graph or at least a minimum number of friends of the first candidate user that are directly connected to the first candidate user; and adding the first candidate user to a friend suggestion inventory for the given user in response to determining that the first candidate user satisfies the suggestion criteria;

comparing a quantity of friends of the given user to a threshold number of friends; and selecting a periodic interval at which to regenerate the friend suggestion inventory based on a result of comparing the quantity of friends of the given user to the threshold number of friends.

19. The system of claim 18, wherein the operations further comprise:
   identifying a second set of unique paths on the entity graph between a second candidate user and the given user, the second candidate user being indirectly connected to the given user;
   determining that a first unique path of the second set of unique paths includes a first friend of the given user that is directly connected to the given user on the entity graph; and
   forming a set of unique friends of the given user by adding the first friend to the set of unique friends in response to determining that the first unique path includes the first friend of the given user, the set of unique friends being used to generate a count of a number of unique friends on which to base adding the second candidate friend to the friend suggestion inventory.

20. A non-transitory machine-readable storage medium that includes instructions that, when executed by one or more processors of a machine, cause the machine to perform operations comprising:
   accessing an entity graph that specifies connections between a plurality of users on a social network;
   selecting a particular user of the plurality of users who is directly connected to a given user on the social network;
   generating a set of candidate users by retrieving a predetermined number of users who are connected to the selected particular user;
   randomly or pseudo-randomly, selecting from the set of candidate users, a first candidate user;
   identifying a set of unique paths on the entity graph between the first candidate user and the given user, the set of unique paths comprising a first path having a first number of edges between the first candidate user and the given user and a second path having a second number of edges between the first candidate user and the given user, the second path being different from the first path;
   computing a quantity of unique paths by counting how many unique paths are included in the set of unique paths between the first candidate user and the given user;
   determining that the first candidate user satisfies suggestion criteria comprising:
      that the quantity of unique paths exceeds a first threshold; and
      that the set of unique paths include at least a minimum number of friends of the given user that are directly connected to the given user on the entity graph or at least a minimum number of friends of the first candidate user that are directly connected to the first candidate user; and
   adding the first candidate user to a friend suggestion inventory for the given user in response to determining that the first candidate user satisfies the suggestion criteria;
   comparing a quantity of friends of the given user to a threshold number of friends; and
   selecting a periodic interval at which to regenerate the friend suggestion inventory based on a result of comparing the quantity of friends of the given user to the threshold number of friends.

* * * * *